United States Patent

Matsuo

(10) Patent No.: US 8,783,694 B2
(45) Date of Patent: Jul. 22, 2014

(54) SEALING STRUCTURE

(75) Inventor: Takeshi Matsuo, Miyaki-Gun (JP)

(73) Assignee: NOK Corporation, Minato-Ku (JP)

(*) Notice: Subject to any disclaimer, the term of this patent is extended or adjusted under 35 U.S.C. 154(b) by 475 days.

(21) Appl. No.: 12/598,962

(22) PCT Filed: May 9, 2008

(86) PCT No.: PCT/JP2008/058599
§ 371 (c)(1),
(2), (4) Date: Nov. 5, 2009

(87) PCT Pub. No.: WO2008/140031
PCT Pub. Date: Nov. 20, 2008

(65) Prior Publication Data
US 2010/0140881 A1      Jun. 10, 2010

(30) Foreign Application Priority Data

May 10, 2007 (JP) .................................. 2007-125702

(51) Int. Cl.
    *F16J 15/02* (2006.01)
(52) U.S. Cl.
    USPC ............................ 277/642; 277/637; 277/644
(58) Field of Classification Search
    USPC ........... 277/598, 616, 626, 627, 637, 644, 642
    See application file for complete search history.

(56) References Cited

U.S. PATENT DOCUMENTS

| | | | | |
|---|---|---|---|---|
| 3,052,478 A | * | 9/1962 | Horvereid | 277/394 |
| 3,494,414 A | * | 2/1970 | Warner | 165/82 |
| 3,584,889 A | * | 6/1971 | Sheets | 277/626 |
| 4,199,158 A | * | 4/1980 | de Munck | 277/648 |
| 5,125,702 A | * | 6/1992 | Fukumoto et al. | 285/337 |
| 6,065,757 A | * | 5/2000 | Schneider et al. | 277/641 |
| 6,102,448 A | * | 8/2000 | Fixemer et al. | 285/330 |
| 6,264,206 B1 | * | 7/2001 | Hashizawa et al. | 277/641 |
| 6,343,623 B2 | * | 2/2002 | Hegler | 138/109 |
| 6,719,302 B2 | * | 4/2004 | Andrick | 277/604 |
| 2004/0173976 A1 | * | 9/2004 | Boggs | 277/628 |
| 2004/0222597 A1 | * | 11/2004 | Benecke | 277/602 |
| 2010/0270745 A1 | * | 10/2010 | Hurlbert et al. | 277/312 |

FOREIGN PATENT DOCUMENTS

| | | |
|---|---|---|
| JP | 02-124371 U1 | 10/1990 |
| JP | 05-050241 U1 | 7/1993 |
| JP | 08-093919 A1 | 4/1996 |
| JP | 2002-340191 A1 | 11/2002 |
| JP | 2004-183738 A1 | 7/2004 |
| JP | 2006-200649 A1 | 8/2006 |
| JP | 2007-085473 A1 | 4/2007 |

* cited by examiner

*Primary Examiner* — Vishal Patel
*Assistant Examiner* — Nicholas L Foster
(74) *Attorney, Agent, or Firm* — Burr & Brown, PLLC

(57) ABSTRACT

A sealing structure having a gasket installed in an installation groove in one member. The gasket has a body section whose width is less than the width of the installation groove. On opposite ends, in the depth direction of the installation groove, there is provided a pair of seal surfaces that contact a surface of another member and the bottom of the installation groove. The bottom surface of the installation groove is a curve that is deepest at its center in the width direction of the groove. On the gasket body section, on the side corresponding to the bottom of the installation groove, there is formed a pair of groove bottom-side projections extending along the longitudinal direction of the gasket with the seal surface between the projections, projecting from opposite ends in the width direction of the body section, and coming into contact with the surface of the installation groove.

2 Claims, 5 Drawing Sheets

US 8,783,694 B2

SEALING STRUCTURE

FIELD OF THE INVENTION

The present invention relates to a sealing structure for sealing a clearance defined between two members with a gasket.

BACKGROUND OF THE INVENTION

Various kinds of sealing devices such as a gasket and a packing have been conventionally known as devices for sealing a clearance defined between two members. They have been formed into various shapes. Moreover, there have been a variety of sealing structures in which the sealing devices are used.

Patent Document 1, for example, discloses a sealing structure, in which a bottom side of a gasket is suppressed from sliding sideways of a installation groove by curving a bottom of the installation groove, so as to prevent the gasket from falling down, and further, the gasket can be installed irrespective of the obverse and reverse thereof by forming the gasket into a symmetric shape in cross section.

Otherwise, Patent Document 2 discloses a packing for an injector, in which projections are formed on both sides in an axial direction on an inner circumferential surface and an outer peripheral surface, and further, portions with and without a squeeze margin are formed at the outer peripheral surface of the injector and the inner circumferential surface of a housing. In this manner, sealability can be exhibited irrespective of the magnitude of a pressure to be exerted on the packing, and further, an increase in filling ratio of the packing to an installation space is suppressed, so that the packing can be prevented from extending into a clearance.

Alternatively, Patent Document 3 discloses a gasket interposed between a cylinder head and a head cover in an engine, in which a clearance is formed between a bottom of a gasket containing groove and the gasket before the gasket is tightened, whereas a part of the gasket is deformed in such a manner as to fill the clearance defined between the groove bottom of the containing groove and the same during tightening, thereby suppressing an exposed portion of the gasket from extending into the clearance defined between the cylinder head and the head cover.

Patent Document 1: Japanese Patent Application Laid-Open No. 2006-200649

Patent Document 2: Japanese Patent Application Laid-Open No. 2002-340191

Patent Document 3: Japanese Utility Model Application Laid-Open No. 2-124371

SUMMARY OF THE INVENTION

In recent years, an installation groove for a gasket may be formed in a metallic housing by pressing for the purpose of reduction of a fabrication cost. When the installation groove is formed by pressing, it is substantially difficult to form the groove into a rectangular shape in cross section. A boundary between a side surface and a groove bottom or a corner of an opening in the installation groove is unexpectedly formed into a curved shape. A dimensional tolerance of the installation groove becomes larger than that of a groove formed by another method.

In the meantime, a sealing device having a smaller configuration has been demanded at the request of miniaturization of a device. The large dimensional tolerance becomes a stumbling block for reducing the size of the device when the installation groove is formed by pressing.

In such a situation that the dimensional tolerance of the shape of the installation groove is large, the gasket may not be satisfactorily prevented from dropping or falling in the above-described prior art. In other words, the above-described prior art is on the precondition that the gasket or the installation groove is precisely formed into a predetermined shape. However, it is difficult to severely limit the shape of the installation groove when the installation groove is formed in the metallic housing by pressing.

This point will be described with reference to FIG. 6. FIG. 6 is a cross-sectional view schematically showing a sealing structure in the prior art.

The sealing structure shown in FIG. 6 seals, with a gasket 300, a clearance defined between two members (one member 100 and the other member 200) to be assembled each other by not-shown means. An installation groove 101 having a substantially rectangular shape in cross section is formed in one member 100. The gasket 300 is placed in the installation groove 101.

The gasket 300 includes a body section 301 and a pair of projections 302 and 303 which projects on both sides of the body section 301 in a widthwise direction, respectively. The body section 301 has an elongated transverse plane, and is formed in a lateral width smaller than that of the installation groove 101 in such a manner that the gasket 300 can be excellently installed in the installation groove 101.

The gasket 300 is installed inside of the installation groove 101, and then, is compressed by assembling one member 100 and the other member 200. Both ends of the body section 301 in a vertical direction are brought into tight contact with a bottom surface 102 of the installation groove 101 and a surface 201 of the other member 200, thereby forming sealing surfaces 304 and 305.

The body section 301 of the gasket 300 has the elongated transverse plane, as described above, and therefore, the gasket 300 is liable to fall down inside of the installation groove 101. In view of this, the projections 302 and 303 extending from both sides of the body section 101 abut against both side surfaces of the installation groove 101, thereby preventing the gasket 300 from falling down.

Moreover, the gasket 300 has the symmetric obverse and reverse in order to enhance the attachability, and therefore, the projections 302 and 303 are formed in the middle of the side surfaces of the body section 301.

However, with the above-described configuration, the bottom 102 and a boundary between the bottom 102 and a side surface 103 in the installation groove 101 are largely curved in pressing the installation groove 101, as indicated by a solid line in FIG. 6. Consequently, a flat region is narrowly formed at the side surface 103 of the installation groove 101.

The projections 302 and 303 are designed to abut against plane side surfaces 103 of the installation groove 101 on the precondition that the installation groove 101 is formed into a substantially rectangular shape in cross section, as indicated by a broken line 104 in FIG. 6. Therefore, when the flat region is small at the side surface 103 in the installation groove 101, squeeze margins I are undesirably formed between the projections 302 and 303 and the installation groove 101 near the bottom of the installation groove 101.

With the squeeze margin, the gasket 300 cannot be contained in the installation groove 101 or reaction force exerted on the gasket 300 by the installation groove 101 during the installation becomes large. As a result, the gasket 300 is placed in an unstable posture, and therefore, it may fall down.

The present invention has been accomplished to solve the problems experienced by the prior art. An object of the present invention is to provide a sealing structure in which a gasket can be stably installed even if an installation groove has a large dimensional tolerance.

Another object of the present invention is to provide a sealing structure in which the gasket can be stably installed irrespective of the dimensional tolerance of the installation groove, thus reducing a fabrication cost.

In order to achieve the above-described objects, a sealing structure according to the present invention seals a clearance between two members with a gasket, in which the gasket is installed in an installation groove formed in one of the two members, and includes a body section whose widthwise dimension in the installation groove is smaller than a groove width of the installation groove and a pair of sealing surfaces in tight contact with the surface of the other of the two members and a bottom surface of the installation groove, respectively, at both ends of the body section in a depth direction of the installation groove. The installation groove is formed into a curve in which the bottom surface is deepest at a center in a groove widthwise direction. Furthermore, a pair of groove bottom side projections projecting from the body section toward both widthwise sides and abutting against the surfaces of the installation groove are formed along the longitudinal direction of the gasket in such a position that the projections are near the groove bottom of the installation groove in the body section of the gasket and the sealing surface in tight contact with the groove bottom of the installation groove is positioned between the projections.

According to the present invention, the gasket installed in the installation groove is supported at three points near the groove bottom, that is, at the end of the body section in tight contact with the groove bottom of the installation groove and the pair of projections abutting against the surfaces near the bottom surface of the installation groove on both sides of the end. Thus, the elongated gasket can be installed in a stable posture.

Furthermore, the curvature of the curved surface of the groove bottom of the installation groove is varied due to the dimensional error during fabrication of the installation groove, and therefore, squeeze margins may be generated between the projections and the installation groove according to the curvature. In such a case, the projections are deformed in such a manner as to fall toward the opening of the installation groove, to absorb reaction force from the installation groove, thereby suppressing the gasket from being installed in an unstable posture. In other words, even if a flat region to be formed becomes narrower at the side surface of the groove due to a large dimensional tolerance of the installation groove, the gasket can absorb the dimensional error of the installation groove, and therefore, the gasket can be installed while being held in the posture, thus suppressing the gasket from falling from the installation groove.

Since the gasket cannot be installed in an unstable posture even if the dimensional tolerance of the installation groove is large, the machining precision of the installation groove can be reduced, thus reducing a fabrication cost.

It is preferable that the installation groove should be formed by pressing.

The gasket cannot be installed in an unstable posture even if the installation groove is formed by pressing which induces a large dimensional tolerance, thus reducing a fabrication cost.

It is preferable that a pair of opening side projections projecting toward both widthwise sides from the body section and abutting against the side surfaces of the installation groove, should be formed near the opening of the installation groove in the body section of the gasket and along the longitudinal direction of the gasket.

In this manner, the projections stabilize the installation posture of the portion near the opening of the installation groove in the body section of the gasket, thus suppressing the gasket from falling.

It is preferable that the transverse plane of the gasket should have a shape symmetric with respect to a center line between the pair of sealing surfaces.

In this manner, the gasket can be installed in the installation groove irrespective of the obverse and reverse of the gasket. Consequently, it is unnecessary to confirm the obverse and reverse of the gasket when the gasket is installed, thus enhancing attachability.

Incidentally, the above-described configurations can be adopted in combination as possible.

As described above, according to the present invention, the gasket can be stably installed even if the installation groove has the large dimensional tolerance, and further, the gasket can be stably installed irrespective of the dimensional tolerance of the installation groove, thus reducing a fabrication cost.

Figure 1:
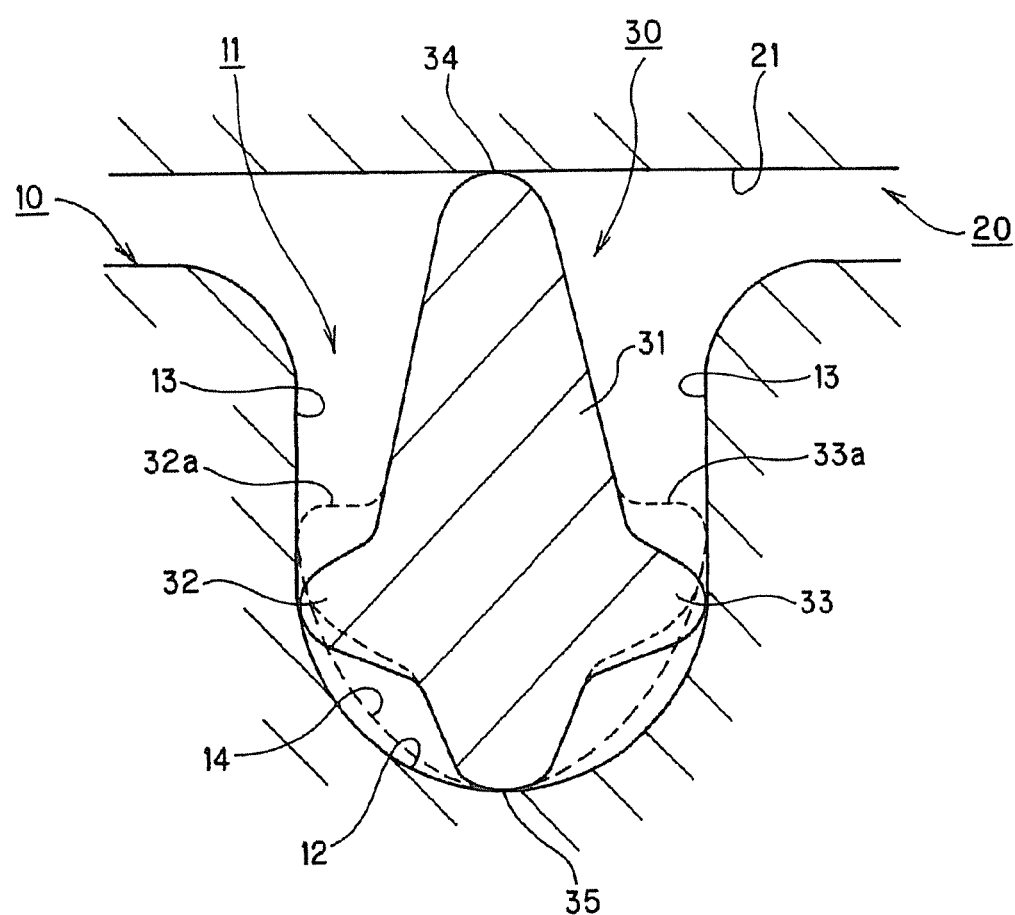
FIG. 1 is a cross-sectional view schematically showing a sealing structure in a first embodiment according to the present invention.

EXPLANATIONS OF REFERENCE NUMERALS 10 one member
11 installation groove
12 groove bottom
13 side surface
20 the other member
21 surface
30 gasket
31 body section
32, 33 projection
34, 35 sealing surface
36, 37 projection

DETAILED DESCRIPTION OF THE INVENTION

Best modes for carrying out the present invention will be illustratively described in detail by way of embodiments with reference to the attached drawings. The dimension, material, shape, and relative arrangement of constituent parts described in the embodiments do not limit the scope of the present invention, unless specially stated.

(First Embodiment)

Figure 2:
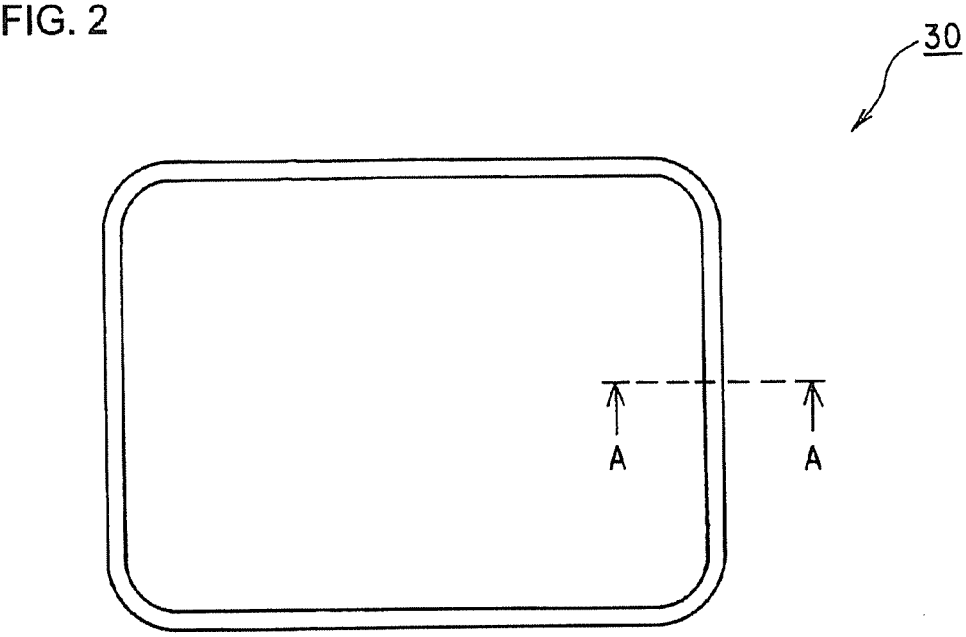
FIG. 2 is a plan view showing a gasket in the first embodiment according to the present invention.
Figure 3:
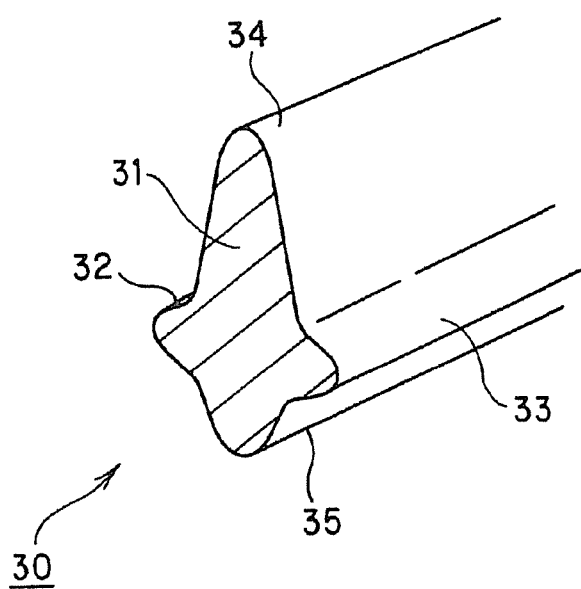
FIG. 3 is a perspective view schematically showing the gasket in the first embodiment according to the present invention.

Referring to FIGS. 1 to 3, a sealing structure in a first embodiment according to the present invention will be described. FIG. 1 is a cross-sectional view schematically showing a sealing structure in a first embodiment according to the present invention; FIG. 2 is a plan view showing a gasket in the first embodiment according to the present invention; and FIG. 3 is a perspective view schematically showing the gasket in the first embodiment according to the present invention.

<Outline of Sealing Structure>

The sealing structure in the present embodiment is designed to seal a clearance defined between two members (one member 10 and the other member 20) with a gasket 30. One member 10 and the other member 20 are to be assembled each other by not-shown means (for example, well known means such as fitting, screwing, or bonding). FIG. 1 shows a state before one member 10 and the other member 20 are assembled each other.

Although a state in which the members are assembled each other is not specially shown, the surface of one member 10 and the surface of the other member 20 may be brought into tight contact with each other in such a manner as to close an installation groove 11 formed in one member 10, so that one member 10 and the other member 20 may be assembled each other depending on a target product. Otherwise, one member 10 and the other member 20 may be assembled each other in such a manner as to form a clearance therebetween to some extent.

<Configuration of Installation Groove>

The installation groove 11 for placing the gasket 30 therein is formed at a surface of one member 10, opposite to the other member 20. The installation groove 11 has a groove bottom 12 formed into a curved surface, and is deepest at the center in a widthwise direction. Furthermore, the installation groove 11 has curved boundaries between the groove bottom 12 and side surfaces 13 and curved boundaries between an opening of the groove and the surface of one member 10. The installation groove 11 is formed into such a shape by pressing at a relatively reduced fabrication cost.

The installation groove forming method is not limited to the pressing. For example, the installation groove may be formed by cutting. In this case, the groove bottom may be curved resulting from a reduced machining precision. In other words, a high machining precision enough to form an installation groove into a substantially rectangular shape in cross section is not required.

<Configuration of Gasket>

The gasket 30 includes a body section 31 and a pair of projections 32 and 33 which projects from the side of the body section 31 near the groove bottom of the installation groove 11 toward both of widthwise sides.

The body section 31 includes a pair of sealing surfaces 34 and 35 at both ends in a vertical direction (i.e., a depth direction of the installation groove 11). One of the sealing surfaces 34 and 35 is brought into tight contact with the groove bottom 12 of the installation groove 11 formed in one member 10; whereas the other is brought into tight contact with a surface 21 of the other member 20. In this manner, a clearance between the two members is tightly sealed.

There are a wide variety of planar shapes (i.e., a shape viewed from the top) of the gasket 30 depending on a target product, to which a gasket is applied. An example of the shape is shown in FIG. 2. Other planar shapes of the gasket are exemplified by circular, polygonal, and complicated shapes. In contrast, the planar shape of the installation groove 11 is similar to that of the gasket 30, although not specially shown.

When the gasket 30 is not compressed between the two members, the transverse plane of the body section 31 is vertically elongated (i.e., a distance between the tips of the sealing surfaces 34 and 35 is greater than a widthwise thickness), and further, the lateral width of the body section 31 is narrower than the groove width of the installation groove 11. Here, the transverse plane signifies a cross section perpendicular to a longitudinal direction of the gasket 30, and is exemplified by a plane taken along a line A-A in FIG. 2.

As described above, the transverse plane of the body section 31 is vertically elongated, thus achieving a squeeze ratio or a filling ratio enough to satisfy sealability even in a small size. In addition, the lateral width of the body section 31 is narrower than the groove width of the installation groove 11, thus enhancing the attachability of the gasket 30 in the installation groove 11.

The sealing surface 35 in tight contact with the groove bottom 12, out of the pair of sealing surfaces 34 and 35, abut against a deepest portion of the groove bottom 12 of the installation groove 11. The pair of projections 32 and 33 abut against the surfaces of the installation groove 11 near the groove bottom 12 on both sides of the sealing surface 35. Consequently, the body section 31 is supported at three points in the installation groove 11 near the groove bottom 12, so that the gasket 30 can be installed in the installation groove 11 in a stable posture.

As shown in FIG. 3, the pair of projections 32 and 33 is formed on both side surfaces of the body section 31 near the groove bottom 12 of the installation groove 11 along the longitudinal direction of the gasket 30, respectively. Consequently, the gasket 30 as a whole can be installed in a stable posture.

The pair of projections 32 and 33 is formed such that the width between the tips thereof becomes substantially the same as the groove width of the installation groove 11. Basically, the pair of projections 32 and 33 are designed (i e , dimensioned and structured) to abut (i.e., compress and deform) against the side surfaces 13 of the installation groove 11.

However, the pair of projections 32 and 33 may abut against inclined surfaces at the boundaries between the groove bottom 12 and the side surface 13, as indicated in a broken line 14 in FIG. 1, due to a dimensional error during fabrication of the installation groove 11. Since the groove width of the groove bottom side of the installation groove 11 is gradually decreased toward the groove bottom side from the opening side, squeeze margins are generated at the tips of the projections 32 and 33 with respect to the installation groove 11. In this case, the projections 32 and 33 are deformed in such a manner as to fall down (i.e., physically deform and be directionally compressed) toward the opening side of the installation groove 11, as indicated by broken lines 32a and 33a in FIG. 1, to abut against the surfaces of the installation groove 11.

<Advantages of the Present Embodiment>

As indicated by the broken lines in FIG. 1, if the squeeze margins are generated between the tips of the projections 32 and 33 and the installation groove 11 due to the dimensional error during the fabrication of the installation groove 11, the projections 32 and 33 are deformed in such a manner as to fall toward the opening side of the installation groove 11, thereby absorbing the dimensional error of the installation groove 11.

That is to say, the projections 32 and 33 fall down, so that reaction force exerted by the installation groove 11 can be relieved to some extent, thus suppressing the gasket 30 from being installed in the installation groove 11 in an unstable posture.

Consequently, when the gasket 30 is installed in the installation groove 11 or the two members are assembled each other after the gasket 30 is installed, the gasket 30 can be suppressed from falling from the installation groove 11.

Moreover, since the projections 32 and 33 fall down, the reaction force from the installation groove 11 can be absorbed. Thus, when the two members are assembled each other, variations in surface pressure generated at the sealing surfaces 34 and 35 can be suppressed, thus stabilizing the sealability.

Additionally, the sealing device in the present embodiment can be used even in a situation of a large dimensional tolerance of the installation groove 11 since the gasket 30 cannot be installed in the unstable posture even if a region to be formed in flat at the side surfaces of the installation groove 11 is reduced due to the dimensional error of the installation groove 11, as described above.

Thus, even if the installation groove 11 is fabricated by adopting the pressing method which induces a large dimensional tolerance, although the cost is low, the attachability of the gasket 30 can be suppressed from being degraded, thereby reducing the fabrication cost.

(Second Embodiment)

Figure 4:
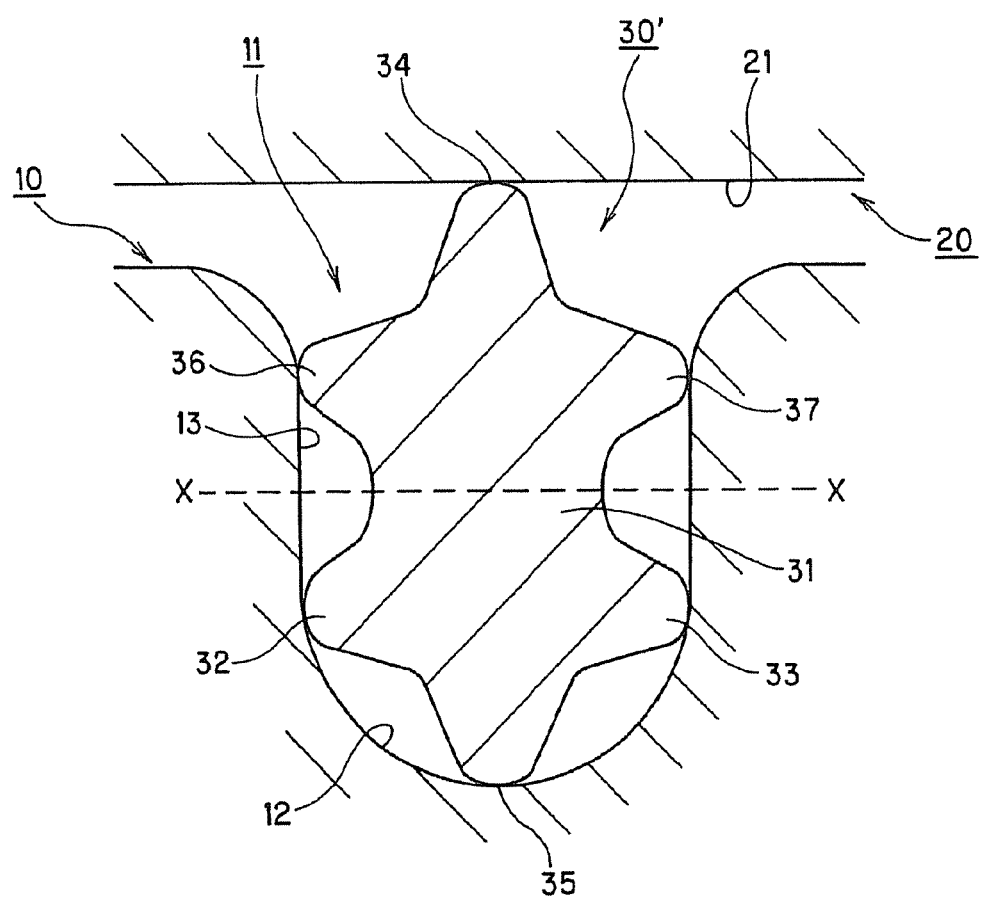
FIG. 4 is a cross-sectional view schematically showing a sealing structure in a second embodiment according to the present invention.

Next, a second embodiment according to the present invention will be described below with reference to FIG. 4. FIG. 4 is a cross-sectional view schematically showing a sealing structure in a second embodiment according to the present invention. In a sealing structure in the present embodiment, a pair of projections 36 and 37 for preventing the gasket 30 from falling is additionally formed near the opening of the installation groove 11 in the gasket 30 in the first embodiment. The other configuration and function are identical to those in the first embodiment, and therefore, the same constituents are designated by the same reference numerals, and their description will not be repeated below.

A gasket 30' in the present embodiment is provided with the pair of projections 36 and 37 projecting from side surfaces in a body section 31 near an opening of an installation groove 11 toward both sides in a widthwise direction. In this manner, the pair of projections 36 and 37 supports the gasket 30' inside of the installation groove 11, thereby suppressing the gasket 30' from falling.

Moreover, the pair of projections 36 and 37 is formed in the entire region in a longitudinal direction of the gasket 30', respectively, like projections 32 and 33 formed near a groove bottom. As a consequence, the gasket 30' as a whole can be installed in a stable posture during installation.

The projections 36 and 37 near the opening and the projections 32 and 33 near the groove bottom are formed with predetermined intervals in such a manner as to allow the projections 32 and 33 formed near the groove bottom to fall toward the opening. Therefore, the side seal surfaces of the gasket 30' are constricted at the center in a vertical direction, as shown in FIG. 4.

As found from FIG. 4, the transverse plane of the gasket 30' is shaped symmetrically to a center line X (a line parallel to a tangent at the tip of the sealing surface 34 and a tangent at the tip of the sealing surface 35 and located at the middle between the tangents) between a pair of sealing surface 34 and 35 (i.e., vertically symmetrically in FIG. 4).

As a consequence, even if the planar shape of the gasket 30' is a circle, an ellipse, or a regular polygon in which an obverse and a reverse of the gasket 30' are formed into the same shape, the gasket 30' can be installed in the installation groove 11 irrespective of the orientation of the obverse and the reverse. In other words, with even the gasket 30' having the same shaped obverse and reverse, the obverse and reverse of the gasket 30' need not be confirmed when the gasket 30' is installed in the installation groove 11, thus enhancing the attachability of the gasket.

(Third Embodiment)

Figure 5:
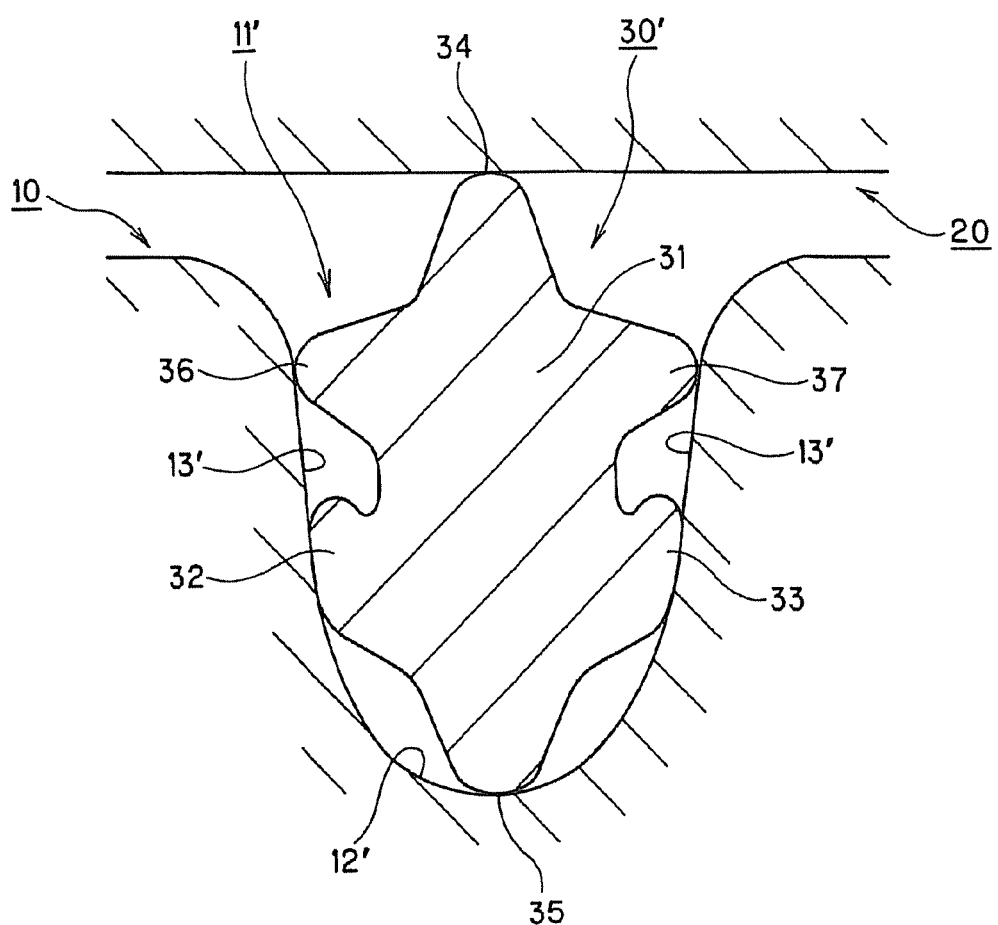
FIG. 5 is a cross-sectional view schematically showing a sealing structure in a third embodiment according to the present invention.
Figure 6:
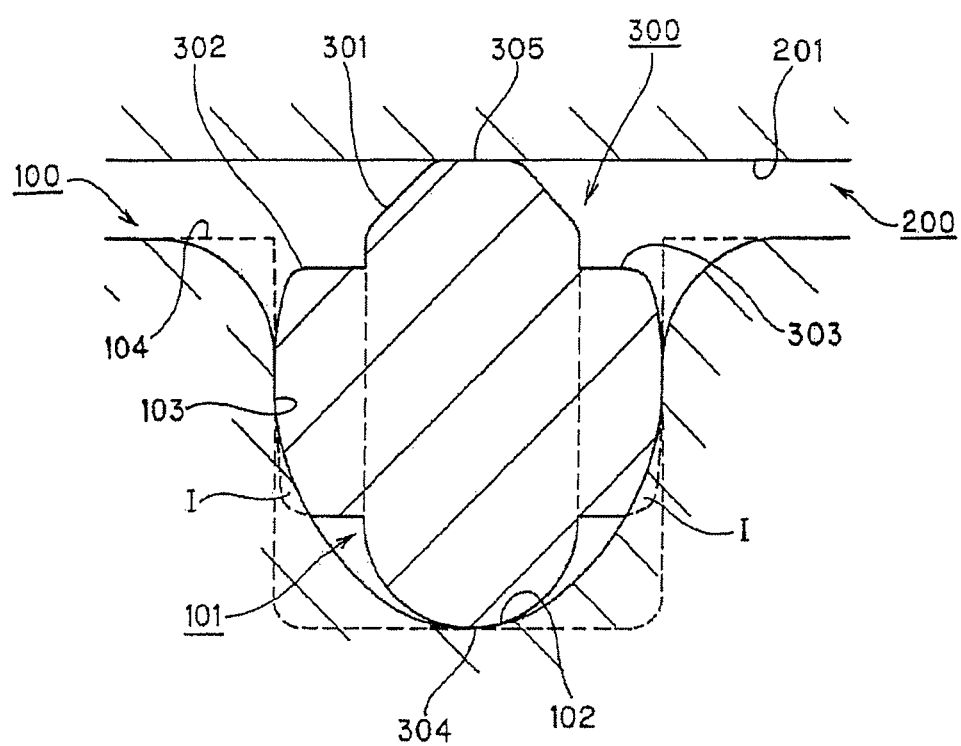
FIG. 6 is a cross-sectional view schematically showing a sealing structure in the prior art.

Subsequently, a third embodiment according to the present invention will be described below with reference to FIG. 5. FIG. 5 is a cross-sectional view schematically showing a sealing device in a third embodiment according to the present invention. In a sealing device in the present embodiment, side surfaces 13 are inclined such that the groove width of the installation groove 11 is enlarged from the groove bottom side toward the opening side in the above-described embodiments. The other configuration and function are identical to those in the above-described embodiments, and therefore, the same constituents are designated by the same reference numerals, and their description will not be repeated below.

If the machining precision of an installation groove is reduced in order to reduce a fabrication cost, the installation groove may be formed into a shape shown in FIG. 5. Specifically, an installation groove 11' is formed in such a manner that its groove width is enlarged from a groove bottom side toward an opening side, and side surfaces 13' are inclined.

Even with the installation groove 11' having such a shape, projections 32 and 33 formed near the groove bottom are deformed in such a manner as to fall toward the opening side of the installation groove 11', a gasket 30' can absorb reaction force from the installation groove 11', so that the gasket 30' can be installed in a stable posture. Consequently, a fabrication cost can be reduced by adopting an inexpensive method.

Although the description is given of the present embodiment by using the gasket 30' in the second embodiment, the gasket 30 in the first embodiment may be used.

The invention claimed is:

1. A sealing structure for sealing a clearance, said sealing structure comprising two members and a gasket installed in an arcuate installation groove formed in one of the two members, the gasket includes a body section whose widthwise dimension in the installation groove is smaller than a groove width of the installation groove and a pair of central single sealing surfaces at opposing ends of the body section in a depth direction of the installation groove, a first central sealing surface in contact with the surface of the other of the two members and a second central sealing surface in contact with a center portion of an arcuate bottom surface of the installation groove that is deepest at the center position thereof;

a pair of groove bottom side projections projecting from the body section of the gasket toward both widthwise sides and abutting only against the arcuate surface of the installation groove, so as to be directionally compressed and physically deformed towards the opening side of the installation groove, with the second sealing surface of the pair of central single sealing surfaces formed along the longitudinal direction of the gasket is in such a position that the projections are near the groove bottom of the installation groove in the body section of the gasket and the second sealing surface is in contact with the groove bottom of the installation groove that is positioned between the projections;

a pair of opening side projections, projecting toward both widthwise sides from the body section and abutting against the side surfaces of the installation groove, are formed near the opening of the installation groove and along the body section of the gasket in the longitudinal direction of the gasket at predetermined intervals with respect to the groove bottom side projections in such a manner so as to allow the groove bottom side projections to directionally compress and physically deform toward the opening side of the installation groove;

a transverse cross-section of the gasket has a shape symmetric with respect to a center line between the pair of central single sealing surfaces of the gasket, with the sealing surfaces being constricted at the center of the sealing surfaces in a vertical direction, and with respect to a center line that is perpendicular to the center line between the pair of central sealing surfaces and traverses the gasket midway between a tip of the first central sealing surface and a tip of the second central sealing surface;

wherein the arcuate installation groove has opposed openly inclined side surfaces that directly connect the curved ends of the arcuate bottom surface of the installation groove to opening sides of the installation groove near the opening of the groove, respectively, and wherein a width between said respective opening sides near the opening of the groove is larger than a predetermined width of the arcuate bottom surface.

2. A sealing structure for sealing a clearance, said sealing structure comprising two members and a gasket installed in an arcuate installation groove formed in one of the two members, the gasket consisting of: (i) a body section whose widthwise dimension in the installation groove is smaller than a groove width of the installation groove, (ii) a pair of central single sealing surfaces at opposing ends of the body section in a depth direction of the installation groove, (iii) a first central sealing surface in contact with the surface of the other of the two members, (iv) a second central sealing surface in contact with a center portion of an arcuate bottom surface of the installation groove that is deepest at the center portion thereof, and (v) a pair of groove bottom side projections projecting from the body section of the gasket toward both widthwise sides and abutting only against the arcuate surface of the installation groove, said side projections being structured and dimensioned so as to be directionally compressed and physically deformed toward the opening side of the installation groove, wherein a horizontal width of the body section of the gasket, in a region where the pair of groove bottom side projections project from the body section, is larger than a vertical width of the pair of bottom side projections substantially from where said projections project from the body section, wherein the second sealing surface of the pair of central single sealing surfaces formed along the longitudinal direction of the gasket is in such a position that the projections are near the groove bottom of the installation groove in the body section of the gasket and the second sealing surface is in contact with the groove bottom of the installation groove that is positioned between the projections, and wherein the arcuate installation groove has opposed openly inclined side surfaces that directly connect the curved ends of the arcuate bottom surface of the installation groove to opening sides of the installation groove near the opening of the groove, respectively, and wherein a width between said respective opening sides near the opening of the groove is larger than a predetermined width of the arcuate bottom surface.

* * * * *